(12) United States Patent
Lindfors (10) Patent No.: US 8,284,201 B2
(45) Date of Patent: Oct. 9, 2012

(54) AUTOMATIC ZOOM FOR A DISPLAY

(75) Inventor: Max Lindfors, Helsinki (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 643 days.

(21) Appl. No.: 12/493,449

(22) Filed: Jun. 29, 2009

(65) Prior Publication Data

US 2010/0328317 A1 Dec. 30, 2010

(51) Int. Cl.
*G09G 5/26* (2006.01)
*G06T 3/40* (2006.01)

(52) U.S. Cl. .................................................... 345/472

(58) Field of Classification Search ............. 345/472, 345/472.1, 472.2
See application file for complete search history.

(56) References Cited

U.S. PATENT DOCUMENTS

| | | | | |
|---|---|---|---|---|
| 2003/0128184 A1* | 7/2003 | Broussard | ..................... | 345/156 |
| 2005/0037815 A1* | 2/2005 | Besharat et al. | ............. | 455/566 |
| 2007/0146356 A1* | 6/2007 | Ladouceur | ..................... | 345/207 |
| 2007/0159470 A1* | 7/2007 | Jeng et al. | ..................... | 345/204 |
| 2009/0040034 A1* | 2/2009 | Drew et al. | ..................... | 340/441 |
| 2009/0043446 A1* | 2/2009 | Drew et al. | ..................... | 701/33 |
| 2009/0256847 A1* | 10/2009 | Hayashi | ..................... | 345/472 |
| 2010/0203876 A1* | 8/2010 | Krishnaswamy | ............. | 455/418 |
| 2010/0295873 A1* | 11/2010 | Dodge et al. | ................. | 345/690 |

OTHER PUBLICATIONS

Light Controlled Software Products, Aug. 1, 1992, IBM Technical Disclosure Bulletin,TDB-ACC-No. NN9208267, vol. No. 35, issue No. 3, pp. 267-269.*
Long Zheng, Windows 7 and light sensors: let there be light, Oct. 30, 2008, http://www.istartedsomething.com/20081030/windows-7-and-light-sensors-let-there-be-light/, 9 pages.*

* cited by examiner

*Primary Examiner* — Jeffery A Brier
(74) *Attorney, Agent, or Firm* — Perman & Green, LLP (57) ABSTRACT

A method, apparatus, user interface and computer program product include the ability to determine a brightness characteristic of a display, use the brightness characteristic to determine a minimum and optimum font size for information displayed on the display, and automatically adjust the displayed information such that a size of a smallest font of the information is not smaller than the minimum font size and that a size of a main font of the information is not smaller that the optimum font size.

20 Claims, 9 Drawing Sheets

AUTOMATIC ZOOM FOR A DISPLAY

BACKGROUND

1. Field

The disclosed embodiments generally relate to user interfaces and in particular to providing an automatic zoom feature for a display.

2. Brief Description of Related Developments

Many devices initially display information at a default zoom level, for example, using a particular predetermined font size for displaying text, or a default size for displaying images regardless of the size of the information or the viewing conditions. When the default zoom level is unacceptable on a regular basis, a user may repeatedly be required to select a menu item, key, soft key, button, etc. to change the zoom level. Constantly adjusting the zoom level may be undesirable for most users and may be unacceptable in cases where handsfree zooming may be required, such as when driving, cycling, or when a user is otherwise occupied.

It would be advantageous to provide a zoom feature that addresses these problems by reducing the need for manual adjustment and by automatically selecting a favorable zoom level for displayed information.

SUMMARY

The disclosed embodiments are directed to at least a method, apparatus, user interface and computer program product. In one exemplary embodiment, a method includes determining a brightness characteristic of a display, determining a minimum and optimum font size for information displayed on the display from the brightness characteristic from a table, and automatically adjusting the displayed information on the display using a module such that a size of a smallest font of the information is not smaller than the minimum font size and that a size of a main font of the information is not smaller that the optimum font size.

In another exemplary embodiment, an apparatus includes a device configured for determining a brightness characteristic of a display, a module configured for determining a minimum and optimum font size for information displayed on the display using the brightness characteristic and further configured for adjusting the displayed information such that a size of a smallest font of the information is not smaller than the minimum font size and that a size of a main font of the information is not smaller that the optimum font size.

In still another exemplary embodiment, a user interface includes a display having a brightness characteristic and a module configured for determining a minimum and optimum font size for information for presentation on the display using the brightness characteristic, and for adjusting the information such that a smallest font size of the information is not smaller than the minimum font size and a main font size of the information is not smaller that the optimum font size.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
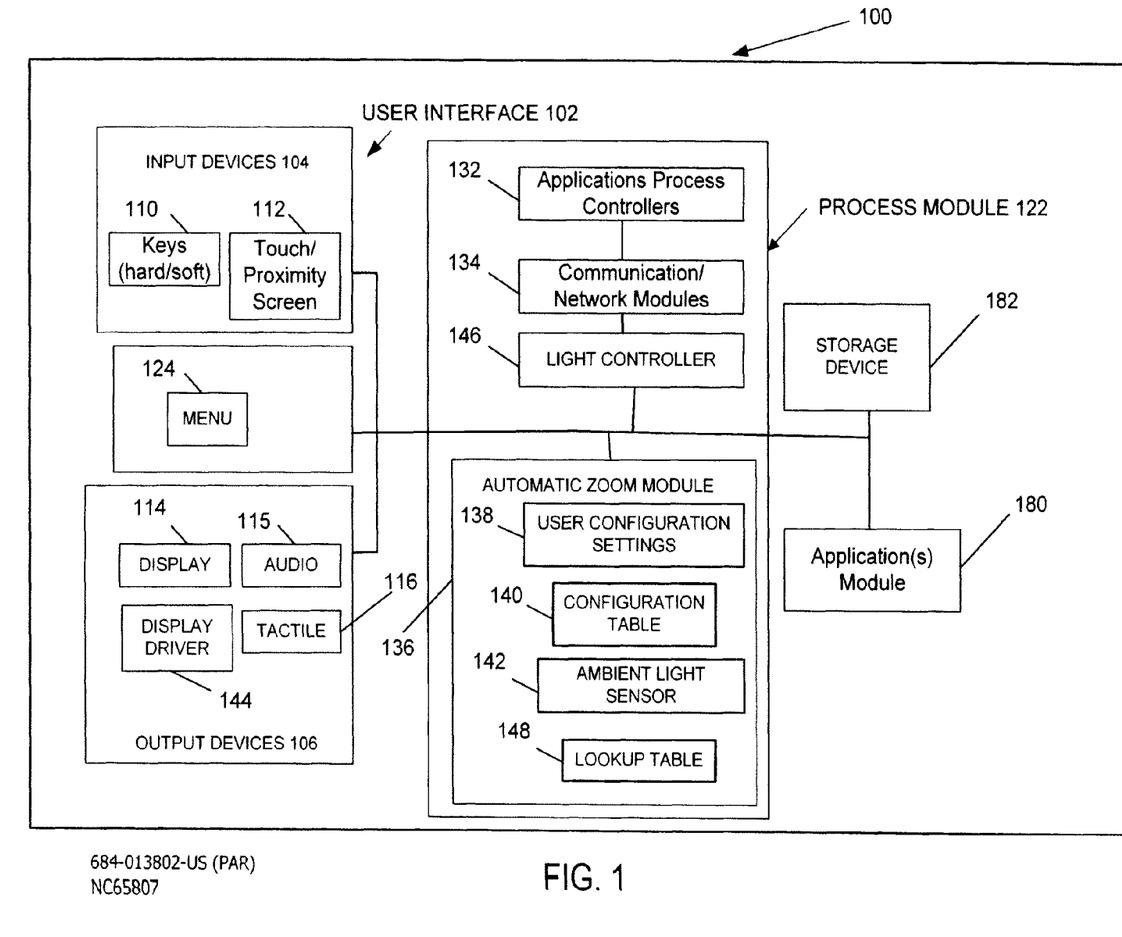
FIG. 1 is a block diagram of a system incorporating aspects of the disclosed embodiments.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The disclosed embodiments generally provide for automatically selecting a zoom level for displayed information by selecting a minimum font size and an optimum font size using a predetermined set of criteria. The minimum font size may be applied to the smallest font found in the information being displayed and the optimum font size may be applied to the main or normal font found in the information being displayed. The smallest font found in the information may be identified by simply examining the fonts and identifying the smallest. The main or normal font may be determined by identifying a font in the information that has been designated as the main or normal font. Alternately, the main or normal font may be determined by examining the fonts found in the information and determining the main or normal font from the method or frequency of use. For example, the font used for titles or headings may be designated as the main font. As another example, the font used most often may be designated as the main font. As yet another example, the largest font may be designated as the main font. Other suitable methods or frequencies may also be used to determine the main font. The criteria for determining the minimum and optimum font sizes may include display luminescence, information in pre-determined tables, user preferences, and other criteria.

System 100 of FIG. 1 includes at least one user interface 102, process modules 122, applications module 180, and storage devices 182. In alternate embodiments, the system 100 can include other suitable systems, devices and components that allow for automatically selecting a zoom level for displayed information. The components described herein are merely exemplary and are not intended to encompass all components that can be included in the system 100. The devices, modules, controllers, and sensors described with respect to the system 100 also include one or more processors, memory storage devices, computer readable mediums, computer program products, and analog and digital support circuitry to execute the processes, methods, sequences, algorithms and instructions described herein.

The user interface 102 generally comprises one or more input devices 104 and output devices 106. The input devices 104 are generally configured to allow the input of data, instructions, information gestures and commands to the system 100. The. input devices 104 can include devices such as, for example, keys or keypad 210, touch sensitive area or screen 112 and other data capture devices 124. In one embodiment, the keypad 110 can be a soft key or other such adaptive or dynamic device of a touch screen. The input devices 104 may also be configured to receive input commands remotely or from another device that is not local to the system 100. The data capture devices can include camera devices (not shown)

or other such other image capturing systems. In alternate embodiments the input devices 104 can comprise any suitable device or devices that allow or provide for the input and capture of data, information and/or instructions, as described herein.

The output devices 106 are generally configured to allow information and data to be presented to the user via the user interface 102 of the system 100 and can include one or more devices such as, for example, a display 114, display driver 144, audio device 115, or tactile output device 116. The display driver may be used to control the brightness or luminescence of the display 114 including any backlighting and to communicate the brightness or luminescence settings to other modules of system 100. In one embodiment, the output device 106 can also be configured to transmit information to another device, which can be remote from the system 100. While the input devices 104 and output devices 106 are shown as separate devices, in one embodiment, the input devices 104 and output devices 106 may comprise a single device, such as for example a touch screen device, and be part of and form, the user interface 102. For example, in one embodiment where the user interface 102 includes a touch screen device, the touch sensitive screen or area 112 can also provide and display information, such as keypad or keypad elements and/or character outputs in the touch sensitive area of the display 114. While certain devices are shown in FIG. 1, the scope of the disclosed embodiments is not limited by any one or more of these devices, and an exemplary embodiment can include, or exclude, one or more devices.

The process module 122 is generally configured to execute the processes and methods of the disclosed embodiments. The application process controller 132 can be configured to interface with the applications module 180, for example, and execute applications processes with respects to the other modules of the system 100. In one embodiment the applications module 180 is configured to interface with applications that are stored either locally to or remote from the system 100 and/or web-based applications. The applications module 180 can include any one of a variety of applications that may be installed, configured or accessible by the system 100, such as for example, office, business, media players and multimedia applications, web browsers and maps. In alternate embodiments, the applications module 180 can include any suitable application. The communication module 134 shown in FIG. 1 is generally configured to allow the device to receive and send communications and messages, such as text messages, chat messages, multimedia messages, video and email, for example. The communications module 134 is also configured to receive information, data and communications from other devices and systems or networks, such as for example, the Internet. In one embodiment, the communications module 134 is configured to interface with, and establish communications connections with the Internet.

In one embodiment, the applications module 180 can also include a voice recognition system that includes a text-to-speech module that allows the user to receive and input voice commands, prompts and instructions, through a suitable audio input device.

The user interface 102 of FIG. 1 can also include menu systems 124 coupled to the processing module 122 for allowing user input and commands and enabling application functionality. The processing module 122 provides for the control of certain processes of the system 100 including, but not limited to the controls for detecting and determining gesture inputs and commands. The menu system 124 can provide for the selection of different tools and application options related to the applications or programs running on the system 100 in accordance with the disclosed embodiments. In the embodiments disclosed herein, the process module 122 receives certain inputs, such as for example, signals, transmissions, instructions or commands related to the functions of the system 100. Depending on the inputs, the process module 122 interprets the commands and directs the process control 132 to execute the commands accordingly in conjunction with the other modules.

As mentioned above, the process module 122 is generally configured to execute the processes and methods of the disclosed embodiments. As such, the process module 122 may include a light controller 146 for controlling the lighting functions of the system 100, and reporting system lighting characteristics, for example, display brightness and luminescence settings, display backlighting settings, and average luminescence of the display 114 based on any combination of brightness, backlight, and actual content of the display. The light controller 146 may include one or more sensors for determining brightness and luminescence of various light emitting devices of the system 100 and one or more processors with support circuitry.

As described herein, the process module 122 is generally configured to automatically select a zoom level for displaying information by determining a minimum and optimum font size for the information, and to use the minimum font size for the smallest font being displayed and to use the optimum font size for the main or normal font being displayed. In at least one embodiment, other fonts that may be present may be scaled accordingly.

In one embodiment, the process module 122 includes an automatic zoom module 136. A user may enable the automatic zoom module 136 by selecting a menu item, key, soft key, button, etc. In other embodiments, the automatic zoom module may be enabled by default unless disabled by the user. In alternate embodiments, the process module 122 can include any suitable function or application modules for automatically selecting a zoom level for displaying information.

The automatic zoom module 136 may include a user configuration settings table 138, a configuration table 140 and an ambient light sensor 142. The tables may be embodied as data tables stored in a computer usable memory. The user configuration settings table 138 may optionally include a user selected minimum and optimum font size, the users vision characteristics, for example, near sighted or far sighted, and the user's age. The configuration table 140 may include minimum and optimum font sizes specifically for the display 114 as a function of one or more of the average display luminescence, the age of the user, and the stroke widths of the fonts in use. Optional criteria in the configuration table 140 may also include ambient lighting, contrast settings of the display, and display content, for example, foreground and background colors, text colors, images, etc. The configuration table 140 may also include any other suitable criteria for selecting the minimum and optimum font sizes. The ambient light sensor 142 operates to measure the brightness of the display 114 and the amount of ambient light in the environment.

The automatic zoom module 136 generally operates to examine the information to be displayed and to select a minimum and optimum font size according to the brightness or luminescence of the display 114 and the functions and criteria of the configuration table 140. Other factors may also be included, for example, the automatic zoom module 136 may also utilize the user configuration settings table 138, or a combination of the functions and criteria of the configuration table 140 and the user configuration settings table 138. The automatic zoom module then applies the minimum and optimum font sizes to the information so that the smallest font displayed is not smaller than the minimum font size and the main font displayed is not smaller than the optimum font size. In at least one embodiment, the maximum font size displayed may be limited by the amount of information and the display size, provided the minimum font size and the optimum font size requirements are met. The automatic zoom module then operates to provide the automatically adjusted information to the display 114.

Figure 2A:
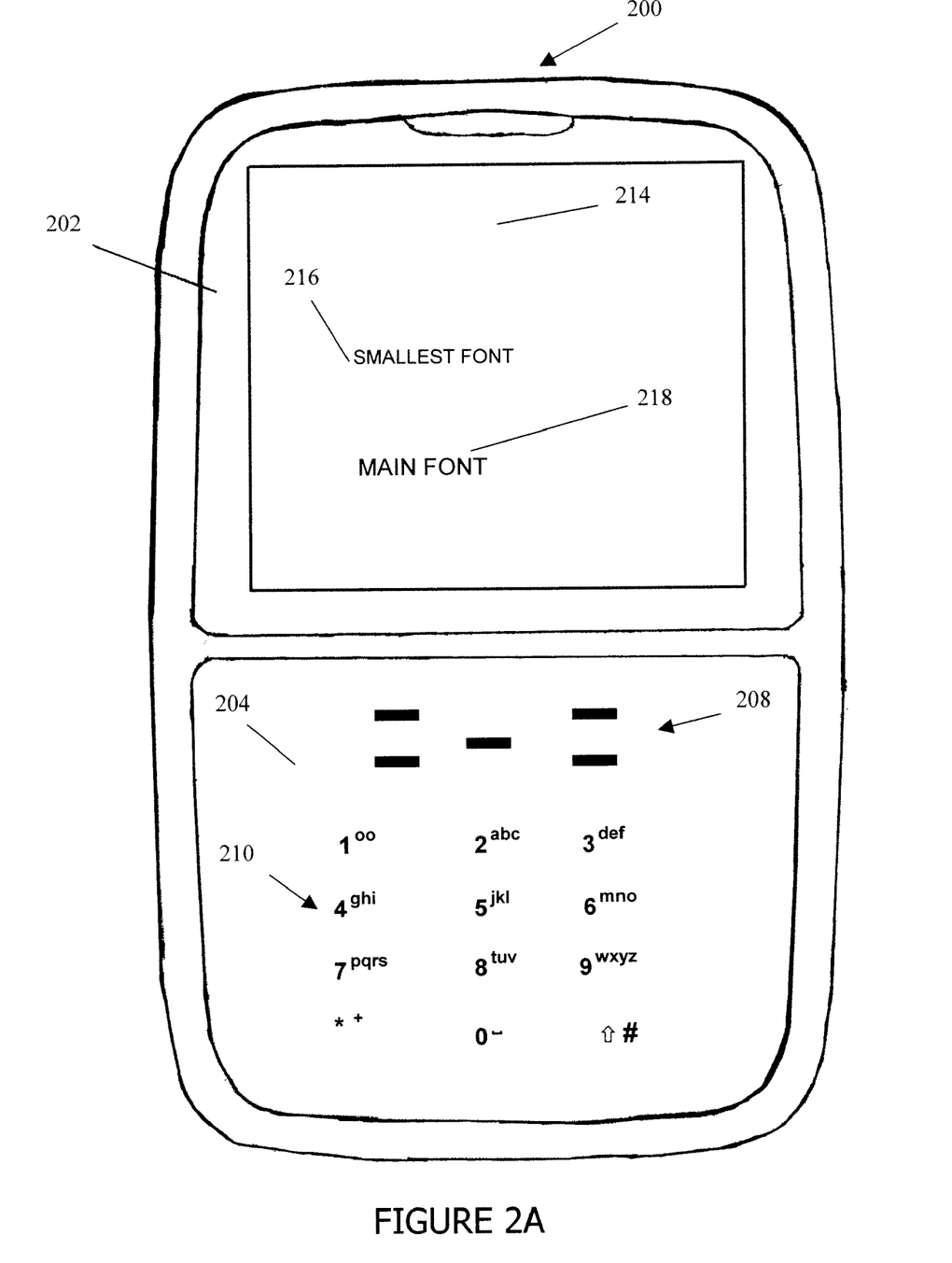
FIG. 2A-2B illustrate user interfaces incorporating aspects of the disclosed embodiments.
Figure 2B:
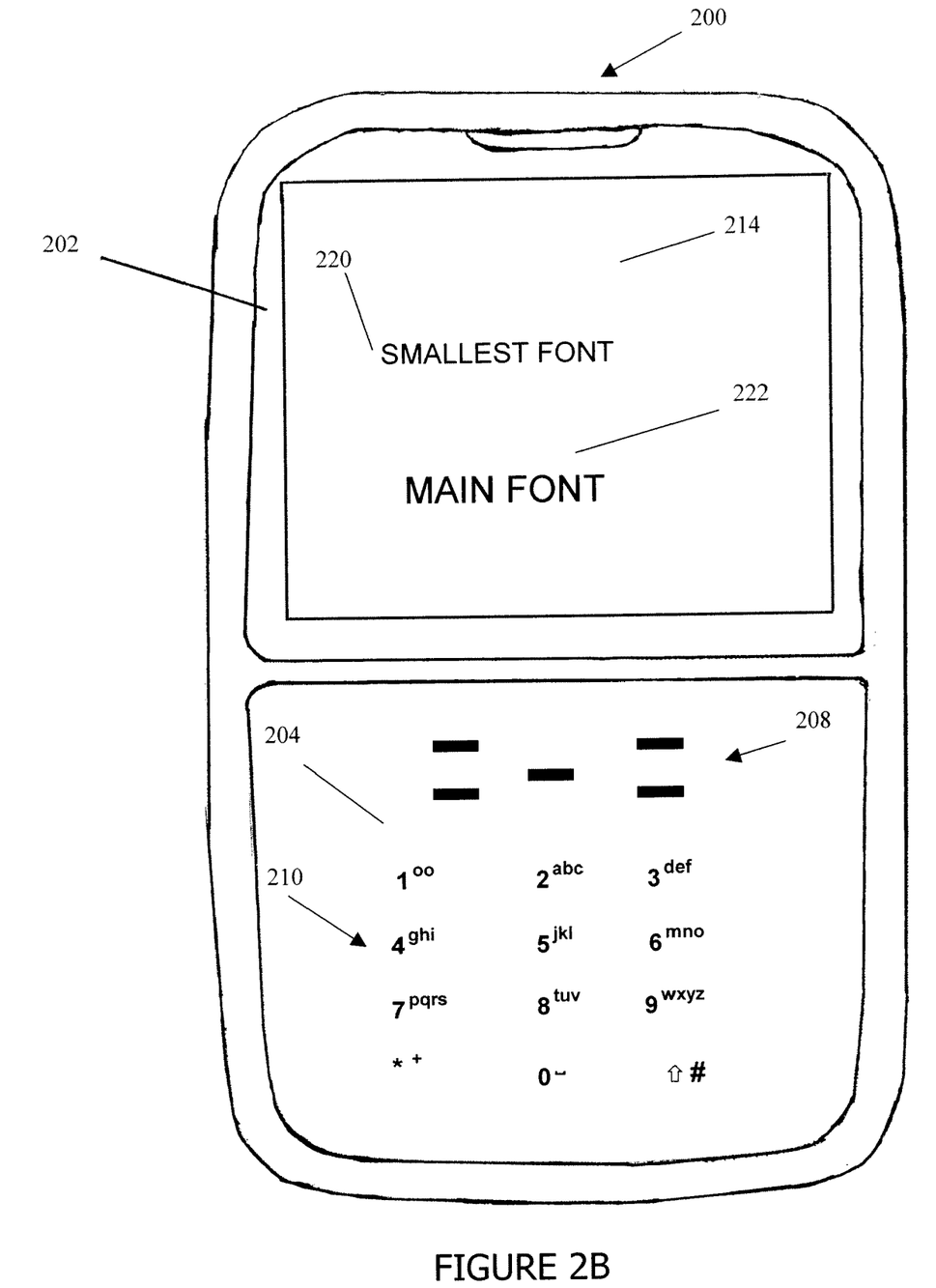

FIGS. 2A-2B illustrate screen shots of exemplary user interfaces incorporating aspects of the disclosed embodiments. As shown in FIG. 2A, the device 200 includes a display area 202 and a touch sensitive area 204. In one embodiment, the touch sensitive area 204 includes a keypad 206 and navigation soft keys 208. As is generally understood, activation of any one of the keys 210 of the keypad 206 will activate the corresponding function, such as generating the corresponding number. The display area 202 can also include a function area 212 that presents functions that are available to be selected and activated in conjunction with the navigation keys 208, as is generally understood. In at least one embodiment, the automatic zoom module 136 may be enabled by activating one or more keys 208, 210 or by selecting one or more menu items on the display 202.

Referring again to FIG. 2A, information 214, in this example, a web page, is presented on the display 202 in a suitable manner. In this embodiment, the smallest font 216 and the main font 218 are identified. The information 214 may be any suitable information that can be presented on a display without limitation. According to the disclosed embodiments, if the automatic zoom feature is enabled, the automatic zoom module 136 operates to determine the display brightness setting and to look up the corresponding values for the minimum and optimum font sizes in the configuration table 140.

As shown in FIG. 2B, the automatic zoom module 136 then operates to zoom the display content such that now the smallest font 220 is not smaller than the minimum font size and the main font 222 is not smaller than the optimum font size. While the size of the display content has been increased in the examples shown, it should be understood that the disclosed embodiments also include decreasing the content size when appropriate so long as the smallest font 220 is not smaller than the minimum font size and the main font 222 is not smaller than the optimum font size. Both increasing and decreasing the display content will be referred to as activating and using a "zoom" function. As is generally understood, the automatic zoom module may operate to "zoom in" or "zoom out", which will make the display content correspondingly larger or smaller. Other alternate terms of art are equally applicable, such as for example, magnify, expand, shrink, increase resolution or decrease resolution.

In at least one embodiment, after the display content has been resized by the automatic zoom module 136, a manual control may be provided to further adjust the amount of zoom manually. For example, the "1" and "7" keys may be used to further "zoom in" or "zoom out," respectively. Other keys and the touch sensitive area 204 may also be used to further adjust the amount of zoom. The automatic zoom module 136 may record the manual adjustments and use them to modify the user configuration settings table 138, the configuration table 140, or both. Alternately, the automatic zoom module 136 an additional lookup table 148 for storing the manual adjustments.

In at least one embodiment, the user may be informed that the automatic zoom module 136 is enabled by a notification. Any suitable notification can be used, for example, an audible or visual notification. As a further example, a corresponding icon or text may appear on the display 114 momentarily, for a pre-determined period of time, or for the duration the automatic zoom module 136 is enabled. If the notification is audible, the notification can comprise a "beep" or "click", or any other suitable sound.

Figure 3:
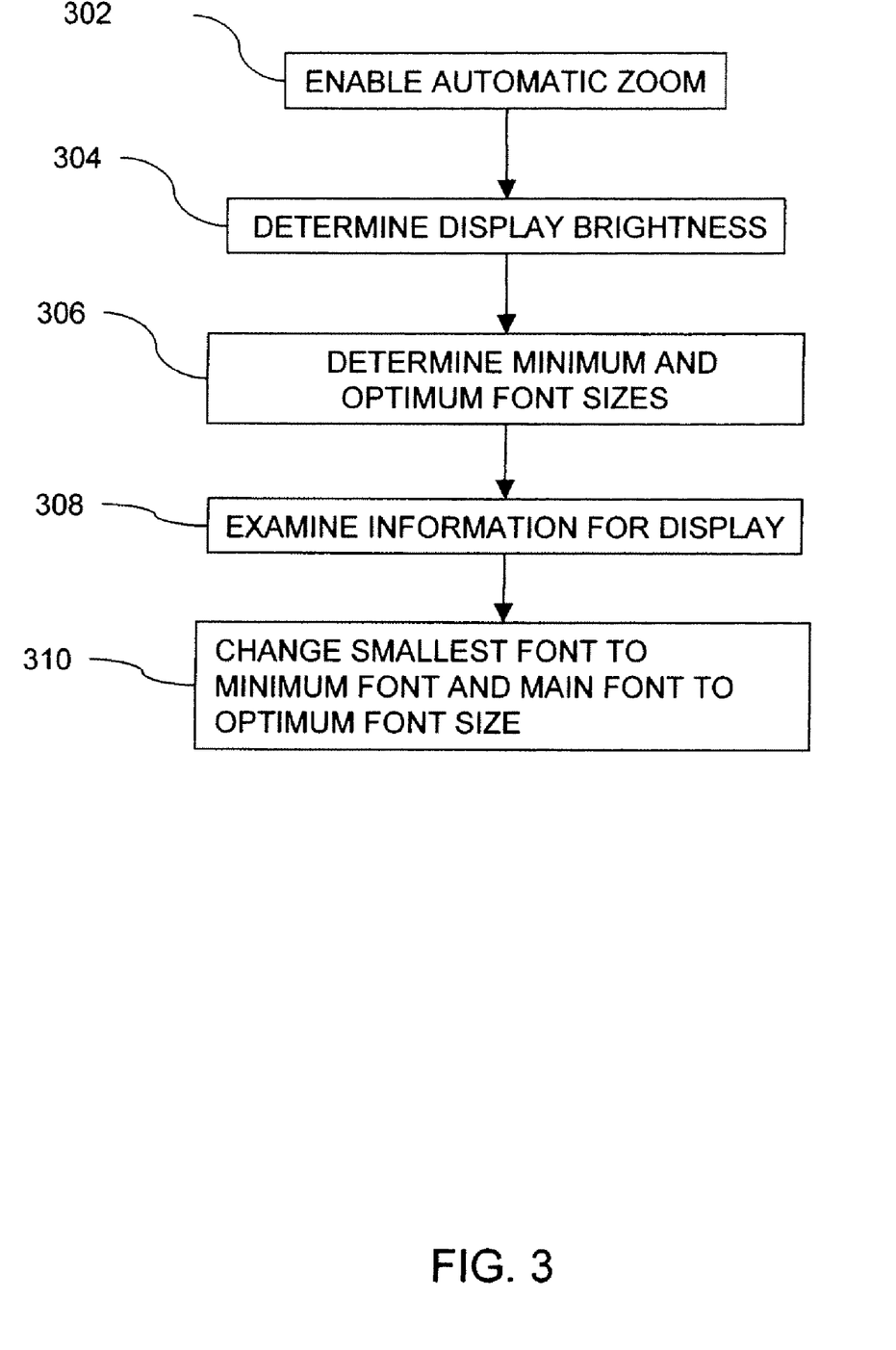
FIG. 3 illustrates an exemplary process including aspects of the disclosed embodiments.

FIG. 3 shows an exemplary process incorporating aspects of the disclosed embodiments. A user may enable the automatic zoom module 302 using any of the techniques described above. After enablement, the display brightness is determined 304 and the minimum and optimum font sizes are determined 306. Information being sent to the display is examined 308 and the smallest font is changed to the minimum font size and the main font is changed to the optimum font size 310.

The automatic zoom module 136 may utilize various techniques for determining the display brightness. The automatic zoom module 136 may receive any combination of display brightness, contrast settings and display backlighting information from the display driver 144. The light controller 146 may also provide system lighting characteristics, for example, display brightness and luminescence settings, display backlighting settings, and average luminescence of the display 114 based on any combination of brightness, backlight, and actual content of the display. The ambient light sensor 142 may also provide information about the brightness of the display 114 and the amount of ambient light in the environment. The automatic zoom module 136 may utilize any combination of the information provided from any of these devices to not only determine the display brightness, but also to factor the brightness value to account for any number of changing conditions, for example, the display itself, the displayed content, conditions in the environment, and any other suitable factor pertinent to providing an automatic zoom level. In at least one embodiment, the automatic zoom module 136 receives a lux value from the ambient light sensor 142 and takes a weighted average of a 50% reflectance display surround and a predicted average luminescence of the display 114.

Figure 4A:
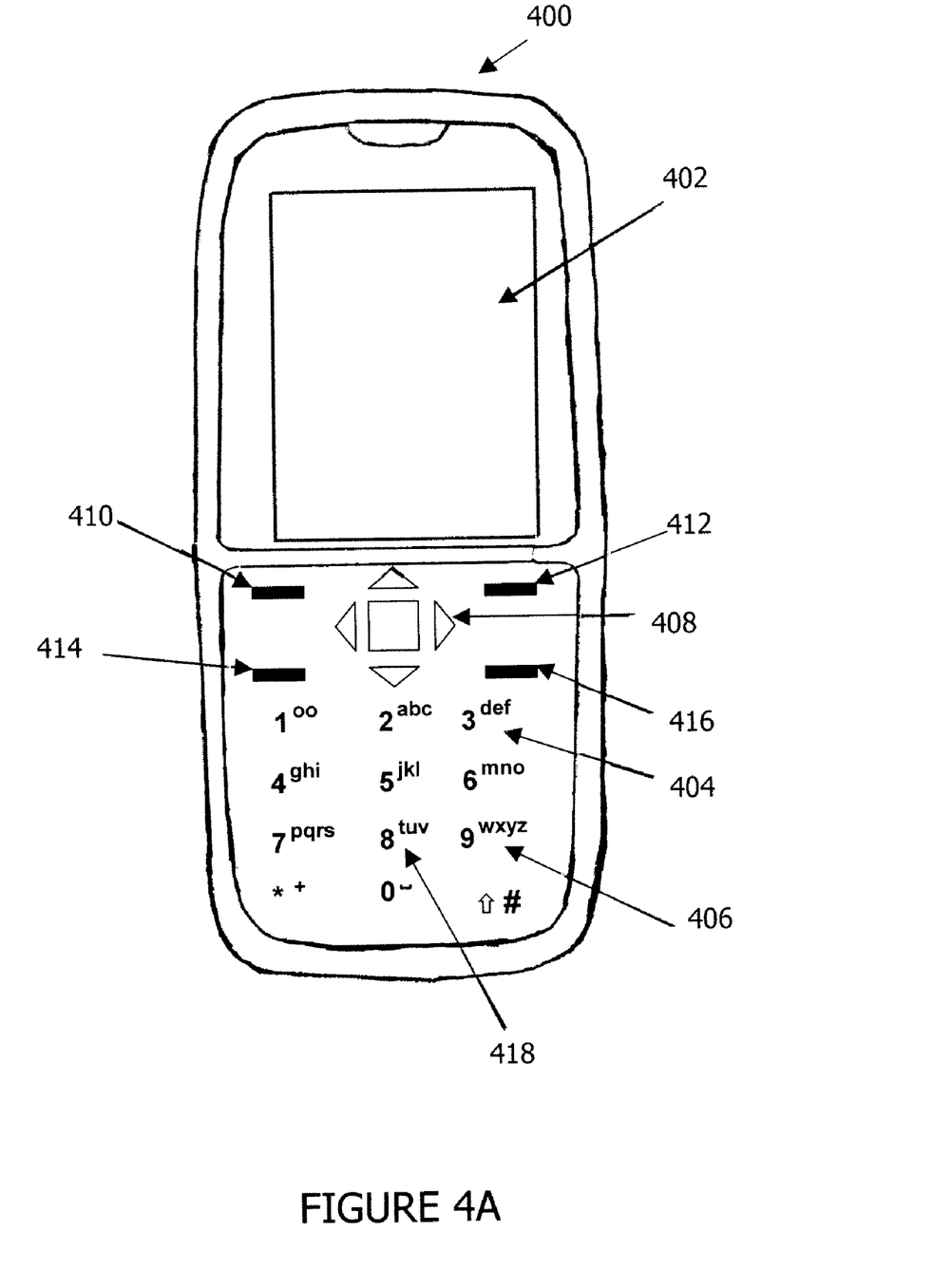
FIG. 4A-4C are illustrations of exemplary devices that can be used to practice aspects of the disclosed embodiments.

Referring to FIGS. 1 and 4A, in one embodiment, the user interface of the disclosed embodiments can be implemented on or in a device that includes a touch sensitive area, touch screen display, proximity screen device or other graphical user interface. In one embodiment, the display 114 is integral to the system 100. In alternate embodiments the display may be a peripheral display connected or coupled to the system 100. A pointing device, such as for example, a stylus, pen or simply the user's finger may be used with the display 114. In alternate embodiments any suitable pointing device may be used. In other alternate embodiments, the display may be any suitable display, such as for example a flat display 114 that is typically made of a liquid crystal display (LCD) with optional back lighting, such as a thin film transistor (TFT) matrix capable of displaying color images.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 4B:
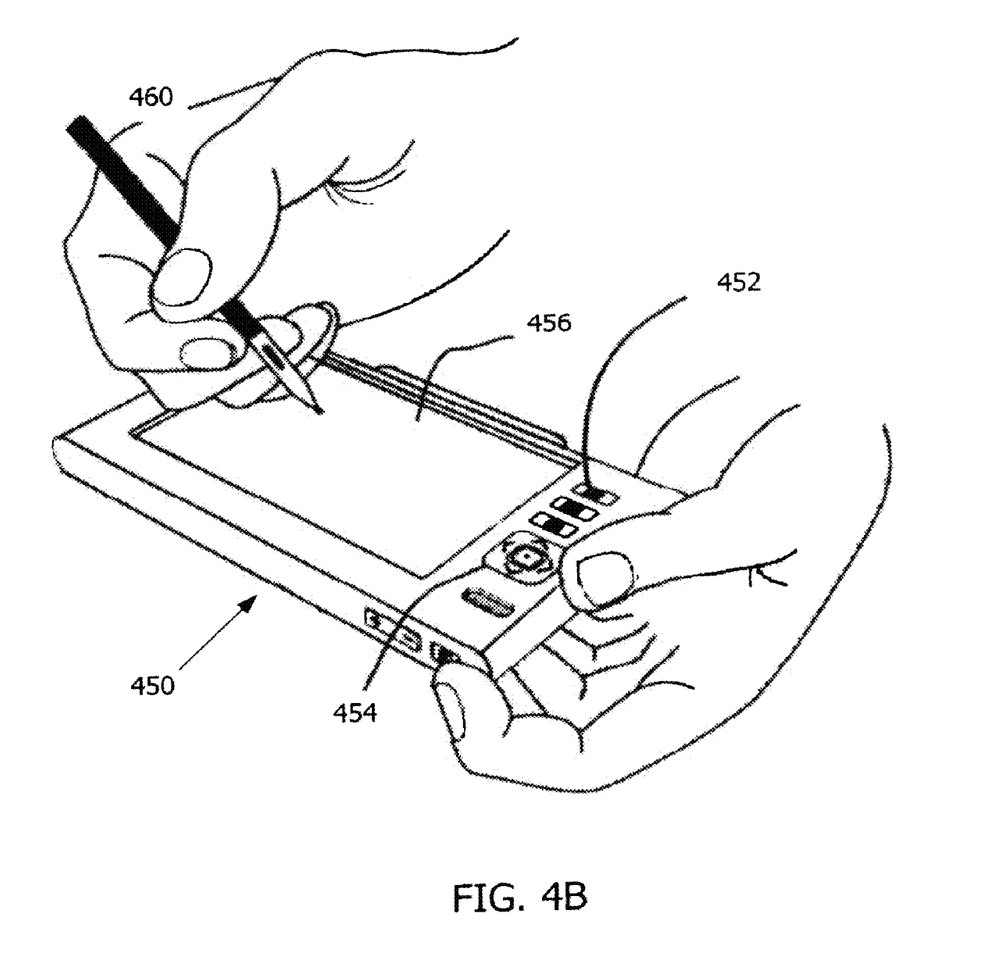
Figure 4C:
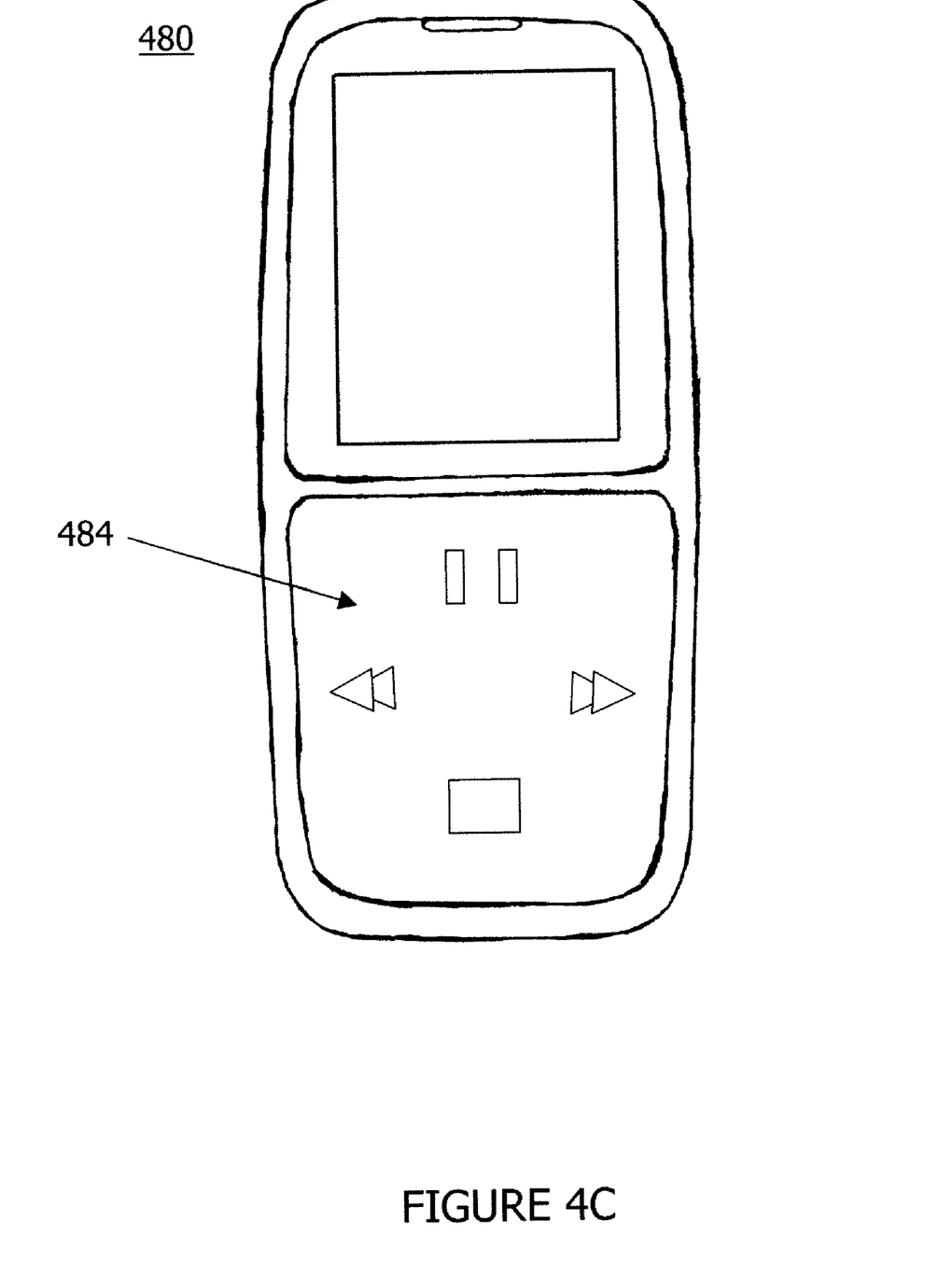

Some examples of devices on which aspects of the disclosed embodiments can be practiced are illustrated with respect to FIGS. 4A-4C. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria and links, and a scroll function can be used to move to and select item(s).

FIG. 4A illustrates one example of a device 400 that can be used to practice aspects of the disclosed embodiments. As shown in FIG. 4A, in one embodiment, the device 400 has a display area 402 and a touch sensitive area 404. The user interface of the disclosed embodiments can be implemented on or in a device that includes a touch sensitive area, touch screen display, proximity screen device or other graphical user interface.

In one embodiment, the touch sensitive area 404 can include keypad 406 as an input device. The keypad 406, in the form of soft keys, may include any suitable user input functions such as, for example, a multi-function/scroll key 410, soft keys 410, 412, call key 414, end key 416 and alphanumeric keys 418. The keypad 406 can also be in the form of the keypad 100 shown in FIG. 1. In one embodiment, referring to FIG. 4C, the touch screen area 484 of device 480 can also present secondary functions, other than a keypad, using changing graphics.

In one embodiment, the display 402 is integral to the device 400. In alternate embodiments the display may be a peripheral display connected or coupled to the device 400. As shown in FIG. 4B, in one embodiment, a pointing device, such as for example, a stylus 460, pen or simply the user's finger may be used with the display 456. In alternate embodiments any suitable pointing device may be used. In other alternate embodiments, the display may be any suitable display, such as for example a flat display 456 that is typically made of a liquid crystal display (LCD) with optional back lighting, such as a thin film transistor (TFT) matrix capable of displaying color images.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

In one embodiment, the device 400 can include an image capture device such as a camera (not shown) as a further input device. The device 400 may also include other suitable features such as, for example a loud speaker, tactile feedback devices or connectivity port. The mobile communications device may have a processor or other suitable computer program product (not shown) connected or coupled to the display for processing user inputs and displaying information on the display 402 and touch sensitive area 404. A computer readable storage device, such as a memory (not shown) may be connected to the processor for storing any suitable information, data, settings and/or applications associated with the mobile communications device 400.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 100 of FIG. 1 may be for example, a personal digital assistant (PDA) style device 450 illustrated in FIG. 4B. The personal digital assistant 450 may have a keypad 452, cursor control 454, a touch screen display 456, and a pointing device 460 for use on the touch screen display 456. In one embodiment, the touch screen display 456 can include the QWERTY keypad as discussed herein. In still other alternate embodiments, the device may be a personal computer, a tablet computer, touch pad device, Internet tablet, a laptop or desktop computer, a mobile terminal, a cellular/mobile phone, a multimedia device, a personal communicator, a television set top box, a digital video/versatile disk (DVD) or high definition player or any other suitable device capable of containing for example a display 114 shown in FIG. 1, and supported electronics such as the processor and memory of FIG. 4A. In one embodiment, these devices will be Internet enabled and include GPS and map capabilities and functions.

Figure 5:
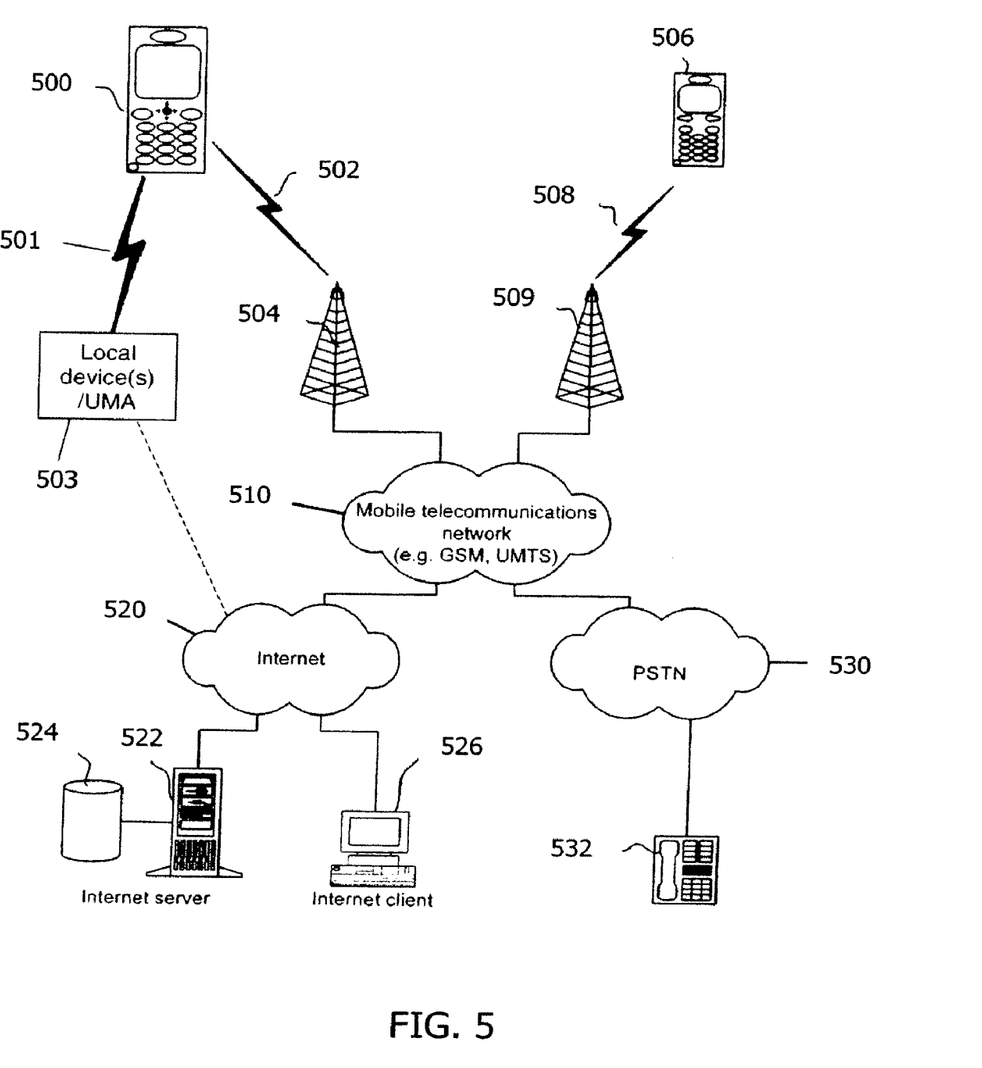
FIG. 5 illustrates a block diagram of an exemplary system incorporating features that may be used to practice aspects of the disclosed embodiments.

In the embodiment where the device 400 comprises a mobile communications device, the device can be adapted for communication in a telecommunication system, such as that shown in FIG. 5. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 500 and other devices, such as another mobile terminal 506, a line telephone 532, a personal computer (Internet client) 526 and/or an Internet server 522.

It is to be noted that for different embodiments of the mobile device or terminal 500, and in different situations, some of the telecommunications services indicated above may or may not be available. The aspects of the disclosed embodiments are not limited to any particular set of services or communication, protocol or language in this respect.

The mobile terminals 500, 506 may be connected to a mobile telecommunications network 510 through radio frequency (RF) links 502, 508 via base stations 504, 509. The mobile telecommunications network 510 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 510 may be operatively connected to a wide-area network 520, which may be the Internet or a part thereof. An Internet server 522 has data storage 524 and is connected to the wide area network 520. The server 522 may host a worldwide web/wireless application protocol server capable of serving worldwide web/wireless application protocol content to the mobile terminal 500. The mobile terminal 500 can also be coupled to the Internet 520. In one embodiment, the mobile terminal 500 can be coupled to the Internet 520 via a wired or wireless link, such as a Universal Serial Bus (USB) or Bluetooth™ connection, for example.

A public switched telephone network (PSTN) 530 may be connected to the mobile telecommunications network 510 in a familiar manner. Various telephone terminals, including the stationary telephone 532, may be connected to the public switched telephone network 530.

The mobile terminal 500 is also capable of communicating locally via a local link 501 to one or more local devices 503. The local links 501 may be any suitable type of link or piconet with a limited range, such as for example Bluetooth™, a USB link, a wireless Universal Serial Bus (WUSB) link, an IEEE 802.11 wireless local area network (MAN) link, an RS-232 serial link, etc. The local devices 503 can, for example, be various sensors that can communicate measurement values or other signals to the mobile terminal 500 over the local link 501. The above examples are not intended to be limiting, and any suitable type of link or short range communication protocol may be utilized. The local devices 503 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 500 may thus have multi-radio capability for connecting wirelessly using mobile communications network 510, wireless local area network or both. Communication with the mobile telecommunications network 510 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the process modules 222 of FIG. 2 includes communication module 234 that is configured to interact with, and communicate with, the system described with respect to FIG. 5.

Figure 6:
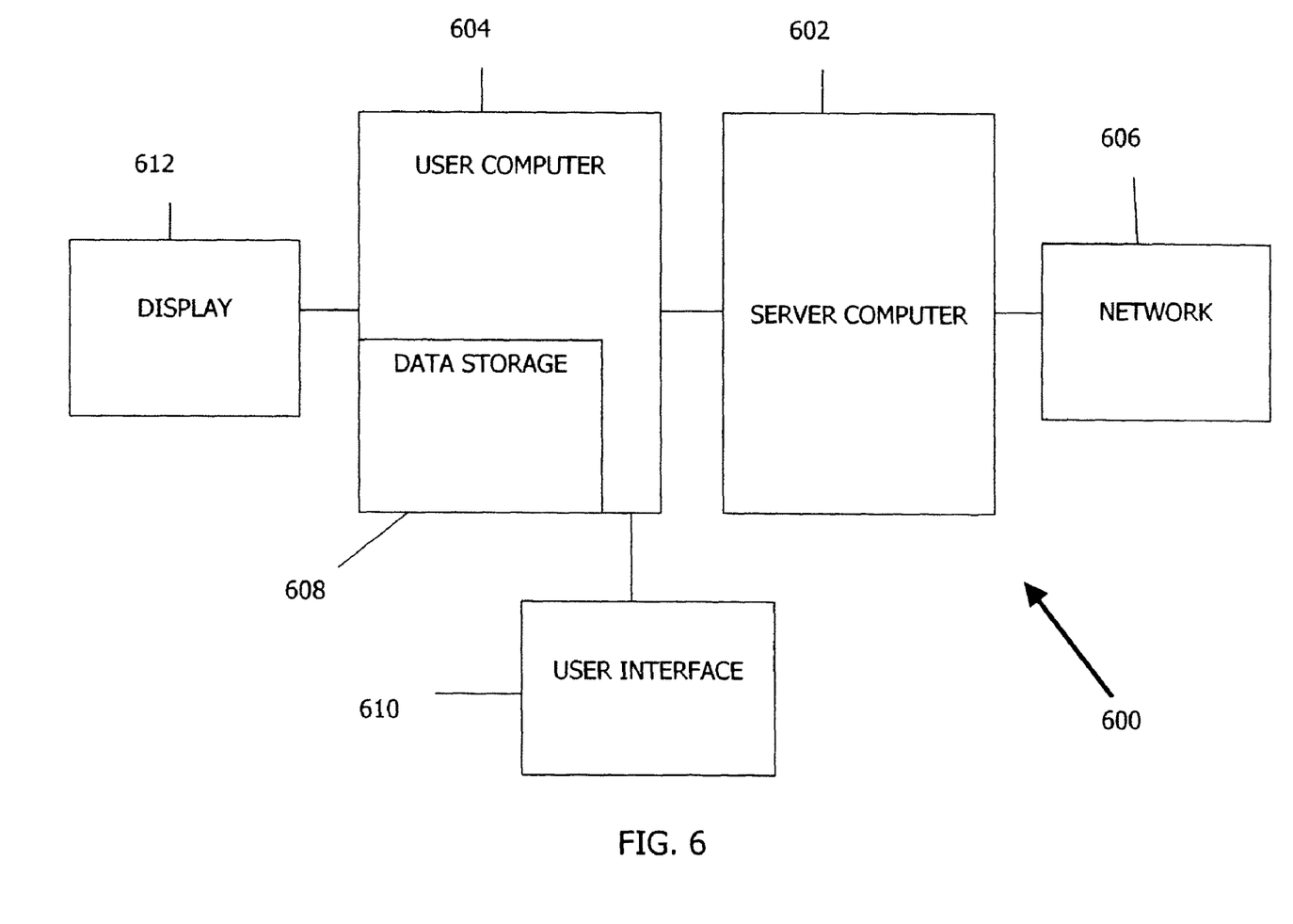
FIG. 6 is a block diagram illustrating the general architecture of an exemplary system in which the devices of FIGS. 4A-4C may be used.

The disclosed embodiments may also include software and computer programs incorporating the process steps and instructions described above. In one embodiment, the programs incorporating the process steps described herein can be stored on or in a computer program product and executed in one or more computers. FIG. 6 is a block diagram of one embodiment of a typical apparatus 600 incorporating features that may be used to practice aspects of the invention. The apparatus 600 can include computer readable program code means stored on a computer readable storage medium for carrying out and executing the process steps described herein. In one embodiment the computer readable program code is stored in a memory of the device. In alternate embodiments the computer readable program code can be stored in memory or memory medium that is external to, or remote from, the apparatus 600. The memory can be direct coupled or wireless coupled to the apparatus 600. As shown, a computer system 602 may be linked to another computer system 604, such that the computers 602 and 604 are capable of sending information to each other and receiving information from each other. In one embodiment, computer system 602 could include a server computer adapted to communicate with a network 606. Alternatively, where only one computer system is used, such as computer 604, computer 604 will be configured to communicate with and interact with the network 606. Computer systems 602 and 604 can be linked together in any conventional manner including, for example, a modem, wireless, hard wire connection, or fiber optic link. Generally, information can be made available to both computer systems 602 and 604 using a communication protocol typically sent over a communication channel or other suitable connection or line, communication channel or link. In one embodiment, the communication channel comprises a suitable broad-band communication channel. Computers 602 and 604 are generally adapted to utilize program storage devices embodying machine-readable program source code, which is adapted to cause the computers 602 and 604 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 602 and 604 may also include a microprocessor for executing stored programs. Computer 602 may include a data storage device 608 on its program storage device for the storage of information and data. The computer program or software incorporating the processes and method steps incorporating aspects of the disclosed embodiments may be stored in one or more computers 602 and 604 on an otherwise conventional program storage device. In one embodiment, computers 602 and 604 may include a user interface 610, and/or a display interface 612 from which aspects of the invention can be accessed. The user interface 610 and the display interface 612, which in one embodiment can comprise a single interface, can be adapted to allow the input of queries and commands to the system, as well as present the results of the commands and queries, as described with reference to FIG. 1, for example.

The disclosed embodiments generally provide for automatically selecting a zoom level for displayed information by selecting a minimum font size and an optimum font size using a predetermined set of criteria. The minimum font size may be applied to the smallest font found in the information being displayed and the optimum font size may be applied to the main or normal font found in the information being displayed. The criteria for selecting the minimum and optimum font sizes may include a user selected minimum and optimum font size, the users vision characteristics, and the user's age. Other criteria may include minimum and optimum font sizes specifically for the display 114 as a function of one or more of the average display luminescence, the stroke widths of the fonts in use, the ambient lighting, contrast settings of the display, and display content, for example, foreground and background colors, text colors, images, etc.

The disclosed embodiments include a user interface 102 with a display 114 having a brightness characteristic, a module 136 configured for determining a minimum and optimum font size for information for presentation on the display using the brightness characteristic, and for adjusting the information such that a smallest font size of the information is not smaller than the minimum font size and a main font size of the information is not smaller that the optimum font size.

The user interface may also include a display driver 144 configured to provide contrast settings of the display 114 for determining the brightness characteristic. The display driver 144 may be configured to provide the brightness characteristic from a content of the display. The user interface 102 may also include a sensor 142 for sensing the brightness characteristic.

The module 136 may be configured for scaling other fonts in the information in relation to the minimum and optimum font sizes.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

The invention claimed is:

1. A method comprising: determining a brightness characteristic of a display; determining a minimum and optimum font size for information displayed on the display from the brightness characteristic from a table; and automatically adjusting the displayed information on the display using a module such that a size of a smallest font of the information is not smaller than the minimum font size and that a size of a main font of the information is not smaller than the optimum font size.

2. The method of claim 1, further comprising determining a brightness characteristic of the display from contrast settings from a display driver.

3. The method of claim 1, further comprising using a controller to determine the brightness characteristic of the display from a content of the display.

4. The method of claim 1, further comprising determining a brightness characteristic of the display using a sensor.

5. The method of claim 1, further comprising scaling other fonts in the information in relation to the minimum and optimum font sizes using the module.

6. The method of claim 1, further comprising using the brightness characteristic to determine the minimum and optimum font size according to a user selected minimum and optimum font size stored in a table.

7. The method of claim 1, further comprising using the brightness characteristic to determine the minimum and optimum font size according to a user's vision characteristics stored in a table.

8. The method of claim 1, further comprising using the brightness characteristic to determine the minimum selected minimum and optimum font size according to a user's age stored in a table.

9. The method of claim 1, further comprising using a manual control for manually adjusting font sizes of the displayed information after the automatic adjustment.

10. A computer program product comprising a non-transitory computer readable storage medium, the computer program product configured to, when executed, cause a processor to:
   determine a brightness characteristic of a display;
   determine a minimum and optimum font size for information displayed on the display from the brightness characteristic from a table; and
   automatically adjust the displayed information on the display using a module such that a size of a smallest font of the information is not smaller than the minimum font size and that a size of a main font of the information is not smaller than the optimum font size.

11. An apparatus comprising: a device configured for determining a brightness characteristic of a display; and a module configured for determining a minimum and optimum font size for information displayed on the display using the brightness characteristic, the module further configured for adjusting the displayed information such that a size of a smallest font of the information is not smaller than the minimum font size and that a size of a main font of the information is not smaller than the optimum font size.

12. The apparatus of claim 11, wherein the device comprises a display driver configured to provide contrast settings of the display for determining the brightness characteristic.

13. The apparatus of claim 11, wherein the device comprises a display driver configured to provide the brightness characteristic from a content of the display.

14. The apparatus of claim 11, wherein the device comprises a sensor for sensing the brightness characteristic.

15. The apparatus of claim 11, wherein the module is further configured for scaling other fonts in the information in relation to the minimum and optimum font sizes.

16. The apparatus of claim 11, further comprising a user configuration settings table for additionally determining the minimum and optimum font size according to a user selected minimum and optimum font size.

17. The apparatus of claim 11, further comprising a user configuration settings table for additionally determining the minimum and optimum font size according to a user's vision characteristics.

18. The apparatus of claim 11, further comprising a user configuration settings table determine the minimum selected minimum and optimum font size according to a user's age.

19. The apparatus of claim 11, further comprising an input device configured for manually adjusting font sizes of the displayed information after the automatic adjustment.

20. A user interface comprising: a display having a brightness characteristic; a module configured for determining a minimum and optimum font size for information for presentation on the display using the brightness characteristic, and for adjusting the information such that a smallest font size of the information is not smaller than the minimum font size and a main font size of the information is not smaller than the optimum font size.

* * * * *